United States Patent Office 3,467,611
Patented Sept. 16, 1969

3,467,611
MIXTURE OF AQUEOUS EMULSIONS
Leon Edward Wolinski, Buffalo, N.Y., assignor to E. I. du Pont de Nemours and Company, Wilmington, Del., a corporation of Delaware
No Drawing. Filed Jan. 7, 1966, Ser. No. 519,188
Int. Cl. C08f 33/08
U.S. Cl. 260—29.6
31 Claims

ABSTRACT OF THE DISCLOSURE

Adhesive compositions are provided of amino-ester modified vinyl polymer emulsions with vinyl-epoxy polymer emulsions wherein the weight ratio of the amino-ester modified vinyl polymer to the vinyl-epoxy polymer is between 1:99 and 99:1.

---

The present invention relates to a composition and a process of manufacture therefor. More particularly, the present invention is directed to an adhesive and coating composition of an amino-ester modified vinyl polymer emulsion and a vinyl-epoxy polymer emulsion and a process of preparation therefor.

Polyvinyl fluoride film structures are noted for their attractive properties primarily because possessing, inter alia, excellent resistance to weathering and deterioration when exposed outdoors, a high degree of physical toughness, chemical inertness, abrasion resistance, resistance to soiling and to the action of solvents as well as remarkable retention of these properties at both low and elevated temperatures. The above combination of properties makes polyvinyl fluoride film structures highly desirable for use as outer layers of a wide variety of laminar structures designed chiefly for outdoor use, especially wherein the polyvinyl fluoride film structure serves to upgrade less functional substrates thus imparting to the laminar structure a degree of utility not possessed solely by either the polyvinyl fluoride film or the substrate material. An essential requirement attaching to laminar structures of polyvinyl fluoride is that the adhesive employed in the manufacture thereof must endure at least as long as the polyvinyl fluoride component thereof. The essential requirements of such an adhesive include a high degree of hydrolytic stability, a high cohesive strength and strong adherence both to the polyvinyl fluoride component and the substrate component of the laminar structure. Preferably, in the case of laminar structures having a flexible layer of polyvinyl fluoride film of about one-half mil to about 5 mils thickness, the polyvinyl fluoride layer thereof should fail as by tearing, etc., before the intermediate adhesive layer fails either cohesively or adhesively. However, the adhesives commonly employed to form laminates have relatively poor adhesive bond strengths when used to form laminates of polyvinyl fluoride, and it is the principal object of the present invention to provide an improved composition useful as an adhesive and coating composition especially for preparing laminar structures of polyvinyl fluoride.

According to the present invention there is provided a composition comprising (1) an amino-ester modified vinyl polymer emulsion having attached to the carbon chain thereof monovalent radicals of the formula:

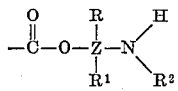

wherein Z is an aliphatic hydrocarbon radical of 2 to 3 carbon atoms, R is selected from the group consisting of hydrogen and alkyl radicals of from 1 to 8 carbon atoms, $R^1$ is selected from the group consisting of hydrogen, hydroxyl radicals, and alkyl radicals of from 1 to 8 carbon atoms, and $R^2$ is selected from the group consisting of hydrogen, hydroxyl and non-tertiary alkyl radicals of from 1 to 8 carbon atoms, said vinyl polymer having an amino nitrogen content of from 0.1% to 8% by weight based upon the total weight of said vinyl polymer, and (2) a vinyl-epoxy polymer emulsion having epoxide groups of the formula:

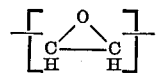

incorporated therein and characterized by an epoxide equivalent of between about $7.69 \times 10^{-5}$ and about $7.69 \times 10^{-3}$ mols of epoxide per gram of said vinyl-epoxy polymer; wherein components (1) and (2) are present in a ratio by weight of between about 1/99 and about 99/1, preferably between 97/3 and 25/75.

According to the present invention there is further provided a process for preparing the above-described composition which comprises mixing an emulsion polymerizate of an amino-ester modified vinyl polymer having attached to the carbon chain thereof monovalent radicals of the formula:

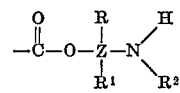

wherein Z is an aliphatic hydrocarbon radical of 2 to 3 carbon atoms, R is selected from the group consisting of hydrogen and alkyl radicals of from 1 to 8 carbon atoms, $R^1$ is selected from the group consisting of hydrogen, hydroxyl radicals, and alkyl radicals of from 1 to 8 carbon atoms and $R^2$ is selected from the group consisting of hydrogen and nontertiary alkyl radicals of from 1 to 8 carbon atoms, and an emulsion polymerizate of a vinyl-epoxy polymer having epoxide groups of the formula:

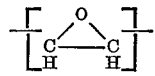

incorporated therein at a temperature below 35° C. and with slight agitation thereby to prevent coagulation of said polymer emulsion and to obtain a mixed polymer emulsion having a ratio by weight of said amino-ester modied vinyl polymer to said vinyl-epoxy polymer of between about 1/99 and 99/1.

The nature and advantages of the composition and process of the present invention will be more clearly understood from the following description thereof.

The adhesive compostion of the present invention is a mixed polymer emulsion of two polymers. One of the two polymers of the composition is an amino-ester modified vinyl polymer. Suitable polymerizable monomers which may be used for preparing the amino-ester substituted vinyl polymer are derived from vinyl monomers characterized by a $CH_2=C<$ group, and include, for example, methyl, ethyl, isobutyl, butyl, octyl, and 2-ethylhexyl acrylates and methacrylates; phenyl methacrylate, cyclohexylmethacrylate, p - cyclohexylphenyl methacrylate, methoxyethyl methacrylate, chloroethyl methacrylate, 2-nitro-2-phenylpropyl methacrylate and the corresponding esters of acrylic acid; methyl alpha-chloroacrylate, octyl alpha-chloroacrylate, methylisopropenyl ketone; acrylonitrile, methacrylonitrile, methyl vinyl ketone; vinyl chloride; vinyl acetate; vinyl propionate; vinyl chloroacetate; vinyl bromide; styrene; vinyl naphthalene, ethyl vinyl ether; butadiene, ethylene, propylene, 2-methyl-butene-1; acrylic, methacrylic, crotonic, maleic, fumaric, 3-butenoic, cinnamic, decadienedicic, and tetrapropenyl-succinic acids; N-vinyl phthalimide; N-vinyl succinimide; N-vinyl carbazole; isopropenyl acetate; methylene diethyl malonate; acrylamide; methacrylamine or monoalkyl substitution products thereof; phenyl vinyl ketone; diethyl fumarate; diethyl maleate; diethyl itaconate; dibutyl itaconate; vinyl pyridine; maleic anhydride; allyl glycidyl ether and other unsaturated aliphatic ethers described in U.S. Patent 2,160,943.

A particularly preferred variety of the vinyl polymers for use in the adhesive mixture of this invention are the acrylic ester polymers containing 89% to 97% of one, or a mixture of two or more, of the acrylate or methacrylate esters derived from the lower aliphatic alcohols having 1 to 8 carbon atoms and additionally containing a sufficient proportion of a methacrylate ester having one of the following primary-amino-substituted ester radicals to provide an amino nitrogen content of between about 0.1% and 8% by weight, based upon the total weight of said vinyl polymer;

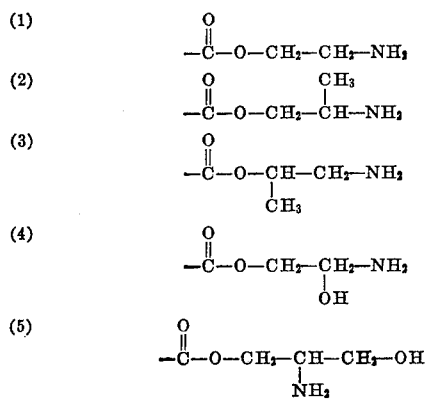

Although the preferred amino-ester modified vinyl polymer component of the adhesive composition of the present invention is comprised predominately of the lower alkyl acrylic or methacrylic esters, it should be pointed out that the composition of the bulk of the vinyl polymer is not critical. However, the amino-ester substituted vinyl polymer must contain at least about 0.1% amino nitrogen and the amino groups must have at least one hydrogen atom attached to the amino nitrogen which is unhindered by bulkyl tertiary alkyl groups, such as a tertiary butyl group. If the amino groups in the ester radical of a vinyl polymer contain no hydrogen atom, i.e., the groups are tertiary, or if the amino groups are hindered, then the modified vinyl polymer emulsion in combination with the vinyl-epoxy polymer emulsion will not yield the requisite adhesive having a high adhesive strength at high humidity. It is believed that the unhindered amino hydrogen atom of the modified vinyl polymers of the composition of the present invention promote adhesion through hydrogen bonding to substrate materials with which they are brought into contact.

The preferred general procedure for preparing the amino-ester modified vinyl polymer component of the composition of the present invention is first to prepare a vinyl polymer of essentially the desired final structure that contains no amino groups but instead contains suitable reactive groups, followed by reacting the preformed vinyl polymer with a suitable reagent for converting either all or only a portion of the reactive groups of the vinyl polymer into amino-ester groups. It is clearly understood, of course, that the vinyl polymers can be prepared directly from a monomer or monomer mixtures containing a monomer having the desired amino-ester groups.

The amino-ester modified vinyl polymer component of the adhesive composition is prepared by emulsion polymerization followed preferably by imination. Emulsion polymerizations are carried out by the general and detailed procedures as described in the following references: (a) Billmeyer, F. W., Jr., Textbook of Polymer Chemistry, chapter 28, Interscience Publishers, Inc., New York, New York, and London, 1957; (b) Flory, P. J., Principles of Polymer Chemistry, chapter V-3, Cornell University Press, Ithaca, N.Y., 1953; (c) Mark, H., and Tobolsky, A, J., Physical Chemistry of High Polymeric Systems, second edition, chapter on Emulsion Polymerization, Interscience Publishers, Inc., New York, N.Y., and London, 1952. In carrying out this procedure, it is generally preferred that the ethylenically unsaturated copolymerizable monomers used to prepare the initial vinyl polymer be combined in an aqueous dispersion containing an emulsifying agent such as a surface active agent, a fatty acid or a cationic soap preferably in the presence of a polymerization catalyst such as, for example, potassium persulfate, and the polymerization reaction is performed at a conveniently controllable elevated temperature, for example, at reflux at a constant pressure, until polymerization is essentially complete. The reagent for introducing the amino-ester groups into the preformed vinyl polymer is then introduced into the vinyl polymer emulsion at a controlled rate with agitation to prevent coagulation and the emulsion is maintained at a temperature in the range of 2° C. to 35° C., preferably at the lower temperatures of the range, until the reagent has been consumed. The polymer emulsion preferably should be stabilized by the addition thereto of suitable bases such as, for example, ammonium hydroxide, to control the pH thereof at a level of at least 9.0, preferably 9.9. The addition of bases also should be at a controlled rate with agitation to prevent coagulation of the polymer emulsion. The most stable emulsions have been prepared by partially polymerizing about 10% of the monomer charge at a lower temperature to provide centers or sites for further polymerization. Normally, the initial polymerization is conducted at 10 to 20° C. below the final polymerization temperature.

Suitable reactive groups which can be introduced into a vinyl polymer and later converted to amino-ester groups include ester radicals of tertiary alcohols, unsaturated ketones, aldehydes or alcohols which can be oxidized directly to carboxyl groups in the acid form or

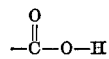

The preferred polymerizable monomers for introducing carboxylic acid groups into a vinyl polymer for subsequent conversion to amino-ester groups are monoethylenically unsaturated monocarboxylic acids, such as acrylic, methacrylic, crotonic and 3-butenoic acids, of which acrylic and methacrylic are preferred. Also, polymerizable unsaturated dicarboxylic acids such as itaconic, citraconic and maleic acids can be employed as well as the anhydrides of such acids which can be introduced into the vinyl polymer and later hydrolyzed to provide the necessary free carboxyl groups.

Vinyl polymers that contain free carboxylic acid groups attached to the carbon chain may be converted to amino-ester modified vinyl polymers by reacting the acid groups with an alkylene imine as exemplified by the following general reaction utilizing a 1,2-alkylene imine:

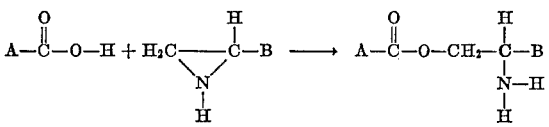

or

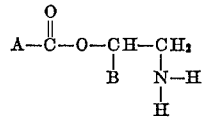

in which B is, for example, hydrogen or an alkyl group having 1 to 8 carbon atoms and A is, for example, hydrogen, a nontertiary alkyl radical of from 1 to 8 carbon atoms or omega-hydroxy substituted non-tertiary alkyl radical of from 1 to 8 carbon atoms. The alkylene imines for converting free carboxylic acid radicals of a vinyl polymer into amino-ester groups are the 1,2-alkylene imines (aziridines), of which 1,2-propylene imine and ethylene imine are preferred because of their availability and relatively low cost. If desired, the N-alkyl substituted or unsubstituted 1,3-alkylene imines (azetidines) can be used to provide the amino-ester groups, since such imines are similar to the 1,2-imines in their chemical reactivity and properties. Such compounds include, for example, 2-methyl aziridine, 2-ethyl aziridine, 2-N-propyl aziridine, 2-isopropyl aziridine, and 2-sec. butyl aziridine and their corresponding azetidines, for example, 2-methyl azetidine, 2-ethyl azetidine, 2-N-propyl azetidine and 2,4-dimethyl azetidines.

The second polymer component of the composition of the present invention is a vinyl-epoxy polymer having epoxide groups of the formula:

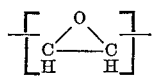

incorporated therein and characterized by an epoxide equivalent of between about $7.69 \times 10^{-5}$ and about $7.69 \times 10^{-3}$ mols of epoxide per gram of said vinyl-epoxy polymer. Suitable polymerizable monomers which may be used for preparing the vinyl-epoxy polymer are derived from vinyl monomers characterized by a $CH_2=C<$ group and include, for example, the vinyl monomeric compounds listed hereinbelow:

Methyl, ethyl, isobutyl, butyl, octyl, and 2-ethylhexyl acrylates and methacrylates; cyclohexylmethacrylate, methoxyethyl methacrylate, chloroethyl methacrylate, and the corresponding esters of acrylic acid; methyl alpha-chloroacrylate, octyl alpha-chloroacrylate, methyl-isopropenyl ketone; acrylonitrile, methacrylontrile, methyl vinyl ketone; vinyl chloride; vinyl acetate; vinyl propionate, vinyl chloroacetate; vinyl bromide; ethyl vinyl ether; butadiene, ethylene, propylene, 2-methyl-butene-1; acrylic, methacrylic, crotonic, maleic, fumaric, 3-butenoic, decadienedicic, and tetrapropenyl-succinic acids; N-vinyl succinimide; N-vinyl carbazole; isopropenyl acetate; methylene diethyl malonate; acrylamide; methacrylamine or monoalkyl substitution products thereof; diethyl fumarate; diethyl maleate; diethyl itaconate; dibutyl itaconate; vinyl pyridine; maleic anhydride; allyl glycidyl ether and other unsaturated aliphatic ethers described in U.S. Patent 2,160,943.

A particularly preferred variety of vinyl-epoxy polymers the acrylic-epoxy polymers, for use in the adhesive mixture of this invention are those containing 50% to 97% of one, or a mixture of two or more, of acrylate or methacrylate esters derived from the lower aliphatic alcohols having 1 to 8 carbon atoms and containing in addition a sufficient proportion of epoxy groups:

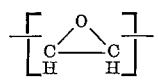

to provide the desired quantity of epoxide equivalents of between about $7.69 \times 10^{-5}$ and about $7.69 \times 10^{-3}$ mols of epoxide per gram of said vinyl-epoxy polymer.

Although the preferred vinyl-epoxy polymers for use in the composition of the present invention are predominately of the lower alkyl acrylic or methacrylic esters, it should be noted that the composition of the bulk of the vinyl polymer is not critical. However, the vinyl-epoxy polymer must contain sufficient epoxide groups to provide from $7.69 \times 10^{-5}$ to $7.69 \times 10^{-3}$ mols of epoxide per gram of said vinyl-epoxy polymer. Thus, in combination with the unhindered hydrogen of the amino-ester modified vinyl polymer, the requisite adhesive yielding high adhesive strength at high humidity will be obtained from a single stable emulsion system of commercially feasible utility.

The preferred procedure for preparing the vinyl-epoxy polymer comprises polymerizing the ethylenically unsaturated copolymerizable monomers such as those abovementioned used for preparing the basic vinyl polymer with an ethylenically unsaturated copolymerizable monomer containing epoxide groups. It is clearly understood, of course, that the vinyl-epoxy polymer can be prepared directly from a monomer or monomer mixtures containing no epoxide group and thereafter incorporating the latter thereinto. Monomers containing epoxide groups which can be used in preparing the vinyl-epoxy polymers used in the adhesive composition of the present invention include for example, glycidyl methacrylate, glycidyl acrylate, allyl glycidyl ether, butadiene monoepoxide, vinyl-cyclohexene epoxide, glycidyl oxyethyl vinyl sulfide, glycidyl sorbate, glycidyl riconoleate, glycidyl allyl maleate, glycidyl vinyl ether, and allyl, alpha and beta-epoxyisovalerate or mixtures of any of the foregoing monomers.

The vinyl-epoxy polymer is prepared by emulsion polymerization in the manner described in the references set forth hereinbefore for conducting emulsion polymerization. In carrying out this procedure, the polymer reactants are combined in an aqueous dispersion containing an emulsifying agent such as a surface-active agent, a fatty acid or a cationic soap, preferably in the presence of a polymerization catalyst such as, for example, potassium persulfate, and the polymerization reaction is performed at a suitable temperature and pressure until polymerization is complete. The vinyl-epoxy polymer emulsion obtained is stable at a pH value as low as about 2.5.

The use of high molecular weight amino acrylics prepared by emulsion polymerization techniques enables the production of polymers having low moduli (required for conformance to dimensional changes that occur in cyclic exposure of laminate structures) and high elongations (required for post-formability). The use of the epoxy acrylics provides a cross-linking medium. The cross-linking density can be controlled by the proportion of the epoxy comonomer used which, in turn, controls the flexibility and the postformability of the resulting compositions.

The following several cross-linking reactions are believed to occur in this system which contributes to the outstanding stability of the compositions:

(1) The self cross-linking reaction of the epoxy acrylic;
(2) The cross-linking reaction of the epoxy and the active hydrogens on the amino groups of the iminated acrylics;
(3) The cross-linking of the epoxies with the non-iminated carboxylic acid groups of the iminated acrylics;
(4) The cross-linking of the amino groups from the imination reaction with the residual carboxylic acid groups of the starting polymer.

The mixed polymer emulsion constituting the composition of the present invention is preferably provided by the process comprising in its broadest aspect carefully and slowly mixing an emulsion polymerizate of the amino-ester modified vinyl polymer described above and an emulsion polymerizate of the vinyl-epoxy polymer described above with slight agitation only in order to prevent coagulation of said polymer emulsions and in a ratio by weight of said amino-ester modified vinyl polymer to said vinyl-epoxy polymer of between about 1/99 and about 99/1. In its more specific aspect the process comprises forming by emulsion polymerization of an amino-ester modified vinyl polymer having attached to the carbon chain thereof monovalent radicals of the formula:

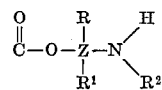

wherein Z is an aliphatic hydrocarbon radical of 2 to 3 carbon atoms, R is selected from the group consisting of hydrogen and alkyl radicals of from 1 to 8 carbon atoms, $R^1$ is selected from the group consisting of hydrogen, hydroxyl radicals, and alkyl radicals of from 1 to 8 carbon atoms and $R^2$ is selected from the group consisting of hydrogen and non-tertiary alkyl radicals of from 1 to 8 carbon atoms; forming by emulsion polymerization a vinyl-epoxy polymer having epoxide group of the formula:

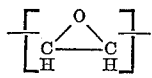

incorporated therein; and mixing an emulsion of said amino-ester modified vinyl polymer and an emulsion of said vinyl-epoxy polymer thereby to obtain a mixed polymer emulsion having a ratio by weight of said amino-ester modified vinyl polymers to said vinyl-epoxy polymer of between about 1/99 and about 99/1.

The mixing of the emulsions is performed by adding one emulsion to the other at a slow rate with only slight agitation so as to prevent coagulation. The agitation preferably should produce no shear. The temperature of the emulsions and any heat from mixing should be kept below 35° C., preferably less than 30° C. The final pH of the mixed polymer emulsion should be maintained at least at 9.0, to provide the desired stability.

The mixed polymer emulsion is activated or coalesced by the elimination of water therefrom at any convenient or suitable temperature such as, for example, room temperature as well as at elevated, preferably controlled, temperatures. A cross-linking reaction occurs and the adhesive is cured when the highly reactive micelles of the mixed polymer emulsion are coalesced.

The addition of water soluble solvents such as dimethyl sulfoxide, dimethyl formamide, dimethyl acetamide, diethylethanolamine and dimethylethanolamine lowers the coalescence temperature of the mixed emulsions and is desirable for some applications.

The laminar structures prepared with the adhesive composition of the present invention comprise preferably a layer of polyvinyl fluoride in the form of a sheet or film bonded to a suitable substrate layer by an interlayer therebetween of the adhesive composition above described.

The sheet of film of polyvinyl fluoride may be formed in accordance with any one of the procedures described in U.S. Patents 2,953,818 and 3,139,470. One convenient method of forming such a film or sheet comprises feeding a mixture of latent solvent and particulate polyvinyl fluoride together either with or without opacifying coloration pigment, ultraviolet light absorber compound, thermal stabilizer, antioxidant, deglossing agents, wetting agents, plasticizers, fillers, and other desired modifiers to a heated extruder of conventional design and provided with a heated casting hopper with lips suitably spaced to form the extrudate passing therebetween into a film of predetermined thickness. The mixture in the extruder is heated to a temperature effective to coalesce completely the polymer particles and form a single phase fluid composition. A tough coalesced extrudate of polyvinyl fluoride is continuously extruded in self-supporting film form containing latent solvent and then quenched. The film is then preferably heated and quenched and stretched in one or more directions while the solvent is volatilized therefrom.

Each surface of the polyvinyl fluoride which is to be adhered to itself or to another substrate layer is activated, that is, is made surface receptive. The surface of polyvinyl fluoride sheets and films are activated in any suitable way such as, for example: exposing the film to a gaseous Lewis acid such as boron trifluoride, aluminum trichloride or titanium tetrachloride or a liquid composition containing a coordination complex thereof; exposing the film to concentrated sulfuric acid, fuming sulfuric acid, sulfur trioxide or hot sodium hydroxide; exposing one surface of the sheet or film to an open flame while cooling the opposite surface; and subjecting the film to a high frequency electrical discharge.

In particular, for example, sheets or films of polyvinyl fluoride may be passed through a treating chamber lined with stainless steel and containing a gaseous mixture consisting of between about 1% and 90% by volume of boron trifluoride held at a temperature of between about 20° C. and 75° C. for a dwell time in the chamber of between about 3 and about 30 seconds. After the treatment with the boron trifluoride, the resulting film is either washed in ammonium hydroxide or water and then air dried or merely washed in water and air dried or heated for a brief period at a temperature of between about 100° C. and 150° C.

Another procedure for treating the surface of polyvinyl fluoride is to contact at least one surface thereof with either concentrated sulfuric acid, fuming sulfuric acid or sulfur trioxide for a time of between about 2 seconds and about 1 minute. After acid treatment, the film is washed in water and air dried. Preferably, the acid solution is held at a slightly elevated temperature, for example, between about 25° C. and 95° C.; less contact time is required when higher temperatures are used.

Still another procedure is to immerse the polyvinyl fluoride sheet or film in a boron trifluoride-ethyl etherate complex followed by washing with water, acetone or ethyl ether and then air drying the treated film. Alternatively, since boron trifluoride coordinates or complexes with a wide variety of organic compounds, particularly amines and oxygen-containing compounds such as ethers, alcohols, esters, acids and amides, complexes other than those with diethyl ether can be employed to chemically activate films of polyvinyl fluoride. For example, the complexes of boron trifluoride with dimethyl ether, methyl-ethyl-ether and phenol are particularly useful because they, like the diethyl ether complex, are liquids at room temperature. Slightly elevated temperatures are preferably employed to increase the rate of dissociation of the complex, thus shortening the immersion time necessary to effect a satisfactory degree of chemical activation.

A still further example of a method of activating the surface of polyvinyl fluoride is to pass a sheet or film thereof at a rate of between about 100 and about 250 feet per minute over and in contact with a chilled metal drum while the exposed surface of the sheet or film that is not in contact with the drum passes through a flame as, for example, a flame of a gas burner fueled with a gaseous mixture of propane and air having a weight ratio of propane-to-air of about 1:25.

A still further method for activating polyvinyl fluoride is to subject the surface thereof to high frequency electrical discharge, preferably in an atmosphere of, for example, nitrogen, ammonia, boron trifluoride, oxygen or air. This may be done, for example, by passing a sheet or film of polyvinyl fluoride at a rate of between about 10 and 300 feet per minute over and in contact with a grounded metal drum while the surface away from the drum passes under and in close proximity to an electrode (for example, between about 0.010 and 0.025 inch) that is connected to a source of high frequency alternating potential.

Examples of suitable substrates include metal substrates such as cold rolled steel, iron, galvanized iron and steel, aluminum, aluminized steel, chromium, bronze, brass, lead, tin and nickel and various other alloys; glass and other vitreous substrates such as those of porcelain and china; impregnated substrates such as asphalt-impregnated cellulosics; hardboards such as "Masonite"; cement-asbestos boards, wood substrates such as those of birch, oak, fir, pine, hemlock, cedar, redwood, poplar and ash, as well as the plywoods for use as siding and roofing for houses and other building structures; and polymeric substrates such as those of homopolymers of vinyl chloride and copolymers thereof with, for example, vinylidene chloride, vinyl acetate and furamic, maleic and acrylic esters, those of regenerated cellulose, those of acrylic esters, those of urea-, melamine, or phenol-formaldehyde resins, and those of vinyl acetates. Laminar articles of polyvinyl fluoride and metal or wooden substrates can be employed in the manufacture of outdoor signs, wall tile, wall and ceiling paneling, venetian blinds, interior partitioning, awnings, ductwork, counter- and tabletops, store fronts, rain gutters and downspouts. Laminar articles of polyvinyl fluoride and metals, particularly of pigmented polyvinyl fluoride films, can be postformed and employed to replace enameled and baked wall, ceiling, floor and side members of applications such as refrigerators, freezers, air conditioners, dehumidifiers, hot-water heaters, washers and dryers, kitchen cupboards and cabinets. In the automotive field, laminar articles of metallized and pigmented polyvinyl fluoride films and metal substrates can be employed variously as automobile doors and side paneling, hard tops, molding, interior and exterior trim, instrument paneling, wheel covers and hub caps, siding and tops for house trailers and truck and van bodies. Also laminar articles of polyvinyl chloride films can be employed in outdoor applications such as automobile tops, convertible tops and accent panels on automobiles, as well as outdoor furniture, awnings and decorative trim for construction products such as doors, window frames, garage doors and store fronts.

Prior to lamination, metallic substrates may and usually are given a conventional passivation or corrosion-inhibiting treatment such as that used commercially to prepare substrates for painting. Laminar structures of polyvinyl fluoride to coated or uncoated fabrics or to polymeric films may serve as headliners, seat covers, floor mats and trunk liners. Other uses for the laminates of this invention include upholstery, floor coverings, lamp shades and book bindings. Of course, a second layer of polyvinyl fluoride also can be used as substrates.

It should be noted that two principal advantages of the adhesive or coating, as in paint, composition of the present invention are the high adhesive strength thereof in the uncured state and the ease of curing thereof under mild curing conditions. These desirable properties render the composition of the present invention well adapted for use in continuous rapid lamination processes in which prolonged exposure of the laminate to high pressure and high temperature cannot economically be provided. The composition of the invention also can be employed to advantage in conventional batch-wise lamination processes in which the laminate is maintained under pressure in a press while the adhesive is partially or completely cured, since low curing temperature can be used.

Although the composition of the present invention has been exemplified herein extensively with regard to preparing laminar structures of polyvinyl fluoride films, the scope of the invention is by no means limited to such application. The composition of the invention may be used for laminating plywood layers, as a binder for nonwoven fibrous mats and papers, as a sizing for fabrics to improve the "feel" or hand thereof, and as an adhesive for both paper base and polymer base photographic films, as well as a paint especially for outdoor use on new or aged wood, and as a primer on metals or wood.

The composition of the present invention when crosslinked and cured retains its flexibility and extensibility and, therefore, is useful for postformability applications, e.g. laminated polyvinyl fluoride film structures may be shaped after their preparation into three-dimensional structures such as hub caps, wheel covers, interior and exterior trim strips, and door and side paneling for automobiles, by bending, stamping, and so forth.

The composition of the present invention have improved hydrolytic stability as is exemplified by the "Blister Box" test illustrated in the examples herebelow, and, additionally, improved corrosion and rust resistance when used as a primer for galvanized and cold rolled steels. The adhesives of the present invention also have the added advantages of non-flammability and non-toxicity.

The composition is "Freeze-Thaw" stable and has demonstrated long term shelf-like stability in excess of four months.

Unlike solvent systems of employing amino-ester modified vinyl polymers and aromatic epoxy resin adhesives, the composition of the present invention is composed of high molecular weight polymers which can be cured to "super" polymers.

The principle and practice of the present invention will now be illustrated by the following examples which are provided to show the practice and use thereof, but it is not intended that the invention be limited thereto since modifications in technique and operation will be apparent to anyone skilled in the art.

The test samples of laminar structures prepared in the following examples were evaluated in accordance with the following testing procedures:

*Corrosion.*—This test was conducted in accordance with the procedure described in ASTM B368–61T–CASS.

*Adhesive bond strength (initial).*—Adhesive bond strength is a measure of the ease of removing polyvinyl fluoride film from a substrate after the adhesive has set. The test is conducted by cutting through the film layer of the laminate with a razor blade in a number of lines ⅛ inch apart, cutting the ends of the resulting section of film away from the substrate, then attempting to strip the individual sections of film away from the substrate with a pair of tweezers. If the ⅛ inch sections of film can be stripped from the substrate, the adhesive is unsatisfactory for use in the continuous production of weather-resistant laminates, which is designated as NO, while if the film sections cannot be stripped loose from the substrate, but break instead, the bonding is considered satisfactory and is designated CNS (cannot be stripped). In some cases, the adhesive bond strength is expressed as the force in grams/inch, applied at an angle of 90°, at a rate of 12 inches/minute, required to separate the polyvinyl fluoride film from the substrate.

*Boiling water test.*—The boiling water immersion test is an evaluation of the adhesive bond strength of a laminate after the laminate has been exposed continuously to boiling water for a period of time. To conduct the test, a series of samples are exposed to boiling water and from time to time a sample is removed and tested as described above and examined for blisters. The results are expressed as the length of time the sample retained CNS bonding and developed no blisters.

*Postformability (dimples).*—A 4-inch by 6-inch sample is cut from one end of each test lamination and four dimples (located at the corners of a 2-inch by 3-inch rectangle centered in the 4-inch by 6-inch sample are pressed into the lamination from the aluminum side (i.e., the polyvinyl fluoride film is outermost on the convex side of each dimple)) in a die using ¾-inch diameter steel balls under a load which gives the maximum depth of dimple without metal fracture. This depth averages about ¼-inch. Starting at the top center of each of two diagonally opposite dimples of each dimpled sample, two parallel cuts ¹⁄₁₆-inch part are made in the film with a No. 10 Exacto Knife blade, the cuts penetrating through to the aluminum substrate and extending down the dimple to the inflection boundary between the dimple and the flat portion of the panel. A No. 10 Exacto Knife blade is then used in an attempt to pry the film strip at its approximate midpoint. If the film strip can be lifted, tweezers are used in an attempt to peel it back. The results are rated as follows:

Dimple rating:                                       Explanation
- 5 _____ Cannot lift film or start peel.
- 3 _____ Film strip can be lifted and peeled from the dimple over a distance of about half of the cut length of the strip.
- 0 _____ Film strip can be lifted and peeled from the dimple past the inflection boundary where the dimple joins the flat surface.

Intermediate rating are given by interpolating between those indicated above.

*Visible light test.*—In this test, samples of laminar articles having an adhesive interlayer between contiguous layers thereof are subjected to the action of actinic light for varying periods of time. This is achieved by placing the samples to be tested a distance of six inches from a bank of 500 watt incandescent flood lamps while the sample is maintained submerged under ¼-inch of water of 55° C. temperature.

EXAMPLE 1

A. Preparation of iminated (amino) acrylic emulsion polymers

The following solutions were charged into a reactor vessel, fitted with a stirrer, reflux condenser, thermometer and nitrogen inlet tube:

Solution 1—
  0.75 gm. sodium lauryl sulfate
  450 gms. distilled water
Solution 2—
  1 gm. potassium persulfate
  40 gms. distilled water
Solution 3—
  320 gms. ethyl acrylate (EA)
  60 gms. methyl methacrylate (MMA)
  20 gms. methacrylic acid (MAA), providing a solution of 80/15/5% by weight of EA, MMA and MAA, based upon the total weight of EA, MMA and MAA.
Solution 4—
  2 gms. sodium lauryl sulfate
  95 gms. distilled water
Solution 5—
  0.31 gm. potassium persulfate
  40 gms. distilled water After initially flushing the reactor vessel with nitrogen, solution 1 was added thereinto and heated to 50° C. Ten percent of solutions 2 and 3 were then added and reacted for about two hours. Then the temperature was raised to 70° C. and the balance of solution 2 was added. The remainder of solution 3 and solution 4 were added dropwise over a two-hour period with slow stirring. After two hours, solution 5 was added and the contents of the reactor vessel were stirred overnight. The resulting emulsion in the reactor vessel was 40.9% solids and had an inherent viscosity of 1.81. The emulsion was reduced to 24% solids and iminated with propylene imine, mol ratio of 1.3 propylene to 1.0 methacrylic acid, as follows:

Solution 6—
  375 gms. of 40.9% solids emulsion
  250 gms. distilled water
Solution 7—
  6.5 gms. propylene imine
  25 gms. distilled water Solution 7 was added to solution 6 with stirring over a ten-minute period at a temperature of 26° C. The emulsion was mixed for thirty minutes at 26° C., and thereafter the temperature of the emulsion was raised to 35° C. and held thereat for 30 minutes, and then cooled at 26° C. Ammonium hydroxide was next added to adjust the pH of the emulsion to 9.9.

B. Preparation of epoxy-acrylic emulsion polymers

The following solutions were charged into a reactor vessel, fitted with a stirrer, reflux condenser, thermometer and nitrogen inlet tube:
Solution 8—
  2.1 gms. sodium lauryl sulfate
  2800 gms. distilled water
Solution 9—
  5.1 gms. potassium persulfate
  124.5 gms. distilled water
Solution 10—
  960 gms. ethyl acrylate (EA)
  960 gms. methyl methacrylate (MMA)
  480 gms. glycidyl methacrylate (GMA),
  480 gms. glycidyl methacrylate (GMA) providing a solution of 40%, 40% and 20% by weight of EA, MMA and GMA, based upon the total weight of EA, MMA and GMA
Solution 11—
  14.4 sodium lauryl sulfate
  492 gms. distilled water
Solution 12—
  2.76 gms. potassium persulfate
  31.1 gms. distilled water After initially flushing the reactor vessel with nitrogen, solution 8 was added thereinto and heated to 70° C. Solution 9 was next added and thereafter salutions 10 and 11 were added dropwise simultaneously. The temperature was maintained at 70° C. during the addition of the monomers. Then solution 12 was added and stirred for 30 minutes at 70° C. The emulsion was cooled with stirring. The resulting emulsion had a solids content of 41.2% an inherent viscosity of 0.40.

C. Preparation of the mixed iminated aminoacrylic polymer and acrylic-epoxy polymer emulsions 33 gms. of polymer emulsion A (EA/MMA/MAA of 80/15/5% by weight) was placed in a vessel, fitted with a stirrer, thermometer and cooling jacket, to which 10 gms. of polymer emulsion B (EA/MMA/GMA of 40/40/20% by weight) was added slowly with continuous slow stirring, to prevent coagulation. The temperature was maintained at 10° C. The final pH was adjusted to a level of 9.9 by the addition of ammonium hydroxide.

The mixed polymer emulsion C was coated onto a 2 mil thick film of polyvinyl fluoride pigmented with titanium dioxide which had been made surface receptive by flame treatment (in accordance with the procedure described in U.S. Patent 3,153,683). The adhesive emulsion was coalesced by drying at 100° C. for 0.5 minute to a dried adhesive thickness of 0.3 mil.

The adhesive coated polyvinyl fluoride film surface was placed in contact with the treated surface of a 23 mil thick aluminum sheet which had been passivated with a coating of Alodine 1200S (an amorphous oxide-chromate) a product of Amchem Products, Inc. The composite structure was then laminated in a press for five minutes at 200 p.s.i.g. and 120° C. and the resultant laminated structure was evaluated provided the following results.

Adhesive bond strength:
  Initial _____ CNS
  1-week boil _____ CNS
  12-week boil _____ CNS Postformability (dimple):
  Initial _____ 5
  24-hour boil _____ 5

Corrosion (percent corrosion at hours indicated):
  24 _____ 5
  48 _____ 10
  72 _____ 35
  96 _____ 55
  120 _____ 55

EXAMPLES 2 TO 31

Following the procedure described in Example 1, a series of adhesive compositions were prepared utilizing various monomer mixtures identified in Table 1 herebelow. Test samples of polyvinyl fluoride film bonded to aluminum (surface treated with Alodine 1200S) also were prepared utilizing the adhesive composition of the examples in Table 1 and the results of evaluation tests are also presented in Table 1:

by weight, respectively, based upon the total weight of the polymeric components, and an epoxy-acrylic polymer emulsion of 40% solids of ethyl acrylate, methyl methacrylate and glycidyl methacrylate of 40%, 40% and 20% by weight, respectively, based upon the total weight

TABLE 1.—ADHESIVE PREPARATION

| | (A) Amino-Ester Modified Vinyl Polymer Emulsion | | (B) Vinyl-Epoxy Polymer Emulsion | | (C) Adhesive composition, Weight ratio (solids basis) of A- to-B |
|---|---|---|---|---|---|
| Example: | Composition | Weight Percent | Composition | Weight percent | |
| 2 | EA-MMA-MAA | 80-15-5 | BA-GMA | 80-20 | 10-4 |
| 3 | EA-MMA-MAA | 80-15-5 | BA-GMA | 80-20 | 10-1.332 |
| 4 | EA-MMA-MAA | 80-15-5 | BA-GMA | 80-20 | 3.37-4 |
| 5 | EA-MMA-MAA | 60-35-5 | BA-GMA | 80-20 | 10-4 |
| 6 | EA-MMA-MAA | 60-35-5 | BA-GMA | 80-20 | 10-1.3 |
| 7 | EA-MMA-MAA | 60-35-5 | BA-GMA | 80-20 | 3.37-4 |
| 8 | EA-MMA-MAA | 40-55-5 | BA-GMA | 80-20 | 10-4 |
| 9 | EA-MMA-MAA | 40-55-5 | BA-GMA | 80-20 | 10-1.32 |
| 10 | EA-MMA-MAA | 40-55-5 | BA-GMA | 80-20 | 3.37-4 |
| 11 | BA-MMA-MAA | 80-15-5 | BA-GMA | 80-20 | 10-4 |
| 12 | BA-MMA-MAA | 80-15-5 | BA-GMA | 80-20 | 10-1.32 |
| 13 | BA-MMA-MAA | 80-15-5 | BA-GMA | 80-20 | 3.37-4 |
| 14 | BA-MMA-MAA | 60-35-5 | BA-GMA | 80-20 | 10-4 |
| 15 | BA-MMA-MAA | 60-35-5 | BA-GMA | 80-20 | 10-1.32 |
| 16 | BA-MMA-MAA | 60-35-5 | BA-MGA | 80-20 | 3.37-4 |
| 17 | BA-MMA-MAA | 40-55-5 | BA-MGA | 80-20 | 10-4 |
| 18 | BA-MMA-MAA | 40-55-5 | BA-GMA | 80-20 | 10-1.32 |
| 19 | BA-MMA-MAA | 60-55-5 | BA-GMA | 80-20 | 3.37-4 |
| 20 | EA-MMA-MAA | 80-15-5 | EA-GMA | 80-20 | 10-1.32 |
| 21 | EA-MMA-MAA | 60-35-5 | EA-GMA | 80-20 | 10-1.32 |
| 22 | EA-MMA-MAA | 40-55-5 | EA-GMA | 80-20 | 10-1.32 |
| 23 | BA-MMA-MAA | 80-15-5 | EA-GMA | 80-20 | 10-1.32 |
| 24 | BA-MMA-MAA | 60-35-5 | EA-GMA | 80-20 | 10-1.32 |
| 25 | BA-MMA-MAA | 40-55-5 | EA-GMA | 80-20 | 10-1.32 |
| 26 | BA-MMA-MAA | 80-15-5 | EA-MMA-GMA | 40-40-20 | 10-1.32 |
| 27 | EA-MMA-MAA | 60-35-5 | EA-MMA-GMA | 40-40-20 | 10-1.32 |
| 28 | EA-MMA-MAA | 40-55-5 | EA-MMA-GMA | 40-40-20 | 10-1.32 |
| 29 | BA-MMA-MAA | 80-15-5 | EA-MMA-GMA | 40-40-20 | 10-1.32 |
| 30 | BA-MMA-MAA | 60-35-5 | EA-MMA-GMA | 40-40-20 | 10-1.32 |
| 31 | BA-MMA-MAA | 40-55-5 | EA-MMA-GMA | 40-40-20 | 10-1.32 |

TEST RESULTS

| | Adhesive bond strength | | Postformability (dimples) | | Corrosion (percent corrosion at hours indicated) | | | | | |
|---|---|---|---|---|---|---|---|---|---|---|
| | Initial | 1-week boil | Initial | 24-hour boil | 24 | 48 | 72 | 96 | 120 | 144 |
| Example: | | | | | | | | | | |
| 2 | CNS | 1,200-PT | 5 | 0 | 0 | 20 | 35 | 45 | | 50 |
| 3 | CNS | CNS | 5 | 4 | 13 | 25 | 28 | 40 | | 45 |
| 4 | CNS | 1,040 | 5 | 0 | 0 | 28 | 38 | 58 | | |
| 5 | CNS | 1,200-PT | 5 | 4 | 10 | 28 | 38 | 50 | | |
| 6 | CNS | CNS | 5 | 4 | 0 | 13 | 45 | 45 | | 50 |
| 7 | CNS | PT | 5 | 3-4 | 0 | 7 | 20 | 32 | 52 | 67 |
| 8 | CNS | CNS | 5 | 4-5 | 5 | 13 | 25 | 55 | 58 | |
| 9 | CNS | CNS | 5 | 4-5 | 0 | 20 | 45 | 60 | 65 | |
| 10 | CNS | CNS | 5 | 4 | 3 | 13 | 50 | 50 | 63 | |
| 11 | CNS | 800 | 5 | 0 | 15 | 15 | 35 | 40 | 55 | |
| 12 | CNS | 1,040 | 5 | 2-3 | 3 | 15 | 20 | 33 | 45 | |
| 13 | CNS | 960 | 5 | 0 | 8 | 10 | 16 | 25 | 48 | 70 |
| 14 | CNS | 1,040 | 0 | 0 | 5 | 5 | 35 | 40 | 65 | |
| 15 | CNS | PT | 4 | 4 | 0 | 10 | 15 | 38 | 50 | |
| 16 | CNS | PT | 5 | 0 | 0 | 8 | 30 | 43 | 53 | |
| 17 | CNS | CNS | 5 | 4 | 20 | 28 | 45 | 50 | 55 | |
| 18 | CNS | PT/CNS | 5 | 4 | 0 | 13 | 45 | 45 | 55 | |
| 19 | CNS | CNS | 5 | 0 | 3 | 10 | 25 | 30 | 40 | |
| 20 | CNS | 1,360 T CNS | 5 | 0 | 15 | 23 | 30 | 40 | 65 | |
| 21 | CNS | PT | 5 | 0 | 0 | 13 | 35 | 40 | 50 | 70 |
| 22 | CNS | CNS | 5 | 5 | 0 | 15 | 25 | 50 | 60 | 65 |
| 23 | CNS | PT | 5 | 0 | 0 | 10 | 25 | 35 | 40 | |
| 24 | CNS | PT | 5 | 4 | 3 | 10 | 20 | 43 | 55 | |
| 25 | CNS | CNS | 5 | 4 | 4 | 13 | 50 | 38 | 62 | |
| 26 | CNS | CNS | 5 | 5 | 5 | 10 | 35 | 55 | 55 | |
| 27 | CNS | CNS | 5 | 4 | 5 | 15 | 45 | 45 | 50 | |
| 28 | CNS | CNS | 5 | 4 | 0 | 15 | 25 | 45 | 63 | |
| 29 | CNS | PT | 5 | 0 | 0 | 10 | 35 | 30 | 50 | 60 |
| 30 | CNS | CNS | 1 | 0 | 0 | 8 | 20 | 25 | 28 | 53 |
| 31 | CNS | CNS | 5 | 5 | 0 | 15 | 40 | 40 | 53 | 65 |

NOTE.—Monomer Abbreviations:
EA is Ethyl Acrylate.
BA is Butyl Acrylate.
MMA is Methyl Methacrylate
MAA is Methacrylic Acid.
GMA is Glycidyl Methacrylate.

EXAMPLE 32

A mixed polymer emulsion useful as a paint primer was obtained by preparing an iminated acrylic polymer emulsion of 25.66% solids of ethyl acrylate, methyl methacrylate and methacrylic acid of 80%, 15% and 5% of the polymeric components, all in a manner similar to that described in Example 1.

The paint primer was obtained by mixing 2.5 parts of the above iminated acrylic polymer emulsion and 9.7 parts of the above epoxy-acrylic polymer emulsion, along with 2 parts of ammonium hydroxide and 3.5 parts of a solution containing 250 parts of water, 125 parts of basic zinc chromate and 0.63 part of Tamol 850 [1].

The paint primer mixture was applied by hand paint brush to a cold rolled steel surface and air dried for 24 hours. The sample was subjected to the corrosion test and at the end of 24 hours exhibited only slight rusting. In contrast, a standard oil based primer, similarly applied and dried, completely failed by under-rusting (excess of ¼ inch under-rusting). Additionally, samples having a top coat of standard white machinery enamel applied over a portion thereof exhibited a life of 96 hours before failure, whereas similarly coated samples having a standard oil based primer failed between 24 and 48 hours.

EXAMPLE 33

The mixed polymer emulsion of Example 32 was employed to make an exterior paint by substituting 25 parts of titanium dioxide for the basic zinc chromate of the emulsion of Example 32.

The exterior paint was applied by brushing and coalesced at room temperature on weathered panels that had been exposed outdoors in Florida for a period of three years. The exterior paint adhered well and continued to adhere well after subjecting the painted panels to immersion in boiling water for seven days.

EXAMPLE 34

A mixed polymer emulsion of 2.5 grams of a 40% solid emulsion of ethyl acrylate, methyl methacrylate, and glycidyl methacrylate of 40%, 40% and 20% by weight, respectively, based upon the total weight of the monomeric components, and 9.7 grams of a 25.66% solids, polymer emulsion of ethyl acrylate, methyl methacrylate, and methacrylic acid of 80%, 15% and 5% by weight, respectively, based upon the total weight of the monomeric components, was applied as a sizing for fabrics to swatches of Orlon [2] and Dacron [2] from baths containing 1% and 3% by weight, respectively, of solids. The sample fabric swatches, dried at 150° C. for 3 minutes, were characterized by a soft hand and could be ironed without scorching or sticking with commercially available electric irons bearing a setting for "synthetic" materials. Washing the sample fabric swatches in common commercially available detergent for 5 minutes with subsequent drying at 100° C. for 10 minutes did not remove the sizing or change the hand of the sample fabric swatches.

EXAMPLE 35

The mixed polymer emulsion employed in Example 34 was applied to a Clupak type high porosity paper by immersing the paper into a bath of the mixed polymer emulsion. The saturated paper was then dried and the mixed polymer emulsion coalesced at 90° C. for 10 minutes. The paper was then folded against itself and, during the press cycle, contacted with commercially available 1.5 mil thick film of Tedlar [3] which had been made surface receptive by flame treatment, and the assembly was pressed at 125° C. for 5 minutes. The resulting structure was boiled in water for 1 hour without delaminating.

Additionally, a sample of the paper was sized with an Anilox [4] handproofer such that the surface thereof was saturated to a depth of about 40%. The paper was then dried and the mixed polymer emulsion was coalesced at 90° C. for 10 minutes. The resulting structure had a high gloss suitable for printing overlays or specialty papers.

EXAMPLE 36

The mixed polymer emulsion employed in Example 33 was used to impregnate a random web of 35% cotton and 65% Dacron [3] polyester fiber for one minute. The impregnated web was dried and the mixed polymer emulsion coalesced at 100° C. for 5 minutes and the product formed was a strong and flexible web having good tensile strength. The material was subjected to three successive washings in a detergent for 5 minutes followed by drying at 100° C. for 10 minutes. The material held together and did not disintegrate. The material is suitable for use as a lining in shoe uppers.

EXAMPLE 37

Following the procedure described in Example 1, a series of adhesive compositions were prepared utilizing a mixed polymer emulsion of ethyl acrylate, methyl methacrylate and glycidyl methacrylate of 40%, 40% and 20% by weight, respectively, based upon the total weight of the monomeric components, and the amino-ester modified vinyl polymers identified in Table 2 herebelow. Test samples of polyimide film bonded to copper and aluminum were prepared utilizing the adhesive compositions of the examples in Table 2 and passing the composite structure of polyimide film and metallic substrate through a nip roll laminator at a speed of 100 feet per minute and a pressure of 20 p.s.i. The results of evaluation tests are also presented in Table 2 below.

TABLE 2

| Sample | Amino-ester modified vinyl polymer emulsion | | Iminating agent | Laminating temperature, °C. | Adhesive bond strength | |
|---|---|---|---|---|---|---|
| | Composition | Weight percent | | | Initial | Cured |
| A | EA-MMA-MAA | 80-15-5 | Propylene imine | 200 | 500 | 1,740 |
| B | EA-MMA-MAA-B | 79-15-5-1 | do | 200 | CNS | CNS |
| C | EA-MMA-MAA | 40-55-5 | do | 200 | 40 | CNS |
| D | EA-MMA-MAA | 40-55-5 | do | [1] 220 | CNS | |

[1] Laminating at 220° C. gives instant CNS bonding; laminating at 200° C. requires post-curing at preferably 150° C. for about 30 minutes.

NOTE.—Monomer Abbreviations:
EA; MMA; MMAA, Same as Table 1.
B is Bis-β-chloroethyl vinyl phosphonate.

EXAMPLE 38

The mixed polymer emulsion of Example 9 was compounded with titanium dioxide pigment to provide a composition of 75% by weight of mixed polymer emulsion and 25% by weight of titanium dioxide, based upon the total weight of the composition. Samples of mixed polymer emulsions containing the ink formulations listed in Table 3 below were coalesced at 100 °C. for 1 minute onto a clear film of polyvinyl fluoride containing 5% by weight, based upon the total weight of film, of poly-4-methacryloxy-2-hydroxybenzophenone ultraviolet light absorbing agent, to provide a reverse printed polyvinyl fluoride film. The coated reverse-printed film was pressed to an uncured unsaturated polyester resin of isophthalic acid, terephthalic acid, propylene glycol and maleic anhydride, and samples of the resulting pressed film were subjected ---
[1] Trademark of Rohm & Haas Company, Inc.
[2] Trademarks of E. I. du Pont de Nemours & Co., Inc., for acrylic fibers and polyester fibers, respectively.
[3] Trademarks of the E. I. du Pont de Nemours & Co., Inc., for polyvinyl fluoride film and polyester fiber, respectively.
[4] Trademark of the Interchemical Corp.

to the visible light test for 72 hours and the results are shown in Table 3 below:

TABLE 3

| Ink formulation | Bond strength, gm./in. |
|---|---|
| Sample: | | |
| A | Morart ink [1] | 80 |
| B | IP Walnut print [2] | 80 |
| C | Decotone 77-669 [3] | 420 |

[1] Morart Printing Co.
[2] Interchemical Printing, Division of Interchemical Corp.
[3] Decotone division of Fitchburg Paper Co., Division of Litton Industries.

Identical structures as described above prepared with the same mixed polymer emulsions but which contained no ink formulations exhibited CNS bonds after exposure to the visible light test for the same period of time.

EXAMPLE 39

Samples were prepared of clear polyvinyl chloride (PVC) film bonded to substrates of plasticized pigmented or coated polyvinyl chloride film by means of an adhesive interlayer comprising the coalesced (at 100° C. for 1 minute) mixed polymer emulsion of Example 9, by pressing the adhesive coated surface (0.2 mil coating thickness) of the clear PVC film to the pigmented PVC film under 100 p.s.i. of pressure at 150° C. for 2 minutes. The substrate materials are listed in Table 4 below which also contains the results of evaluation tests performed on the samples:

EXAMPLE 41

Samples of polyvinyl fluoride film were bonded to fir plywood panels by means of an adhesive interlayer comprising the coalesced (at 100° C. for 2½ minutes) mixed polymer emulsion of Example 9 by pressing the adhesive coated surface (1.5 mils coating thickness) of the polyvinyl fluoride films to the plywood panels under conditions of pressure, temperature and time of 100 p.s.i., 150° C. and 2 minutes, respectively.

When subjected to accelerated weathering conditions by exposure in an XW Weather-O-Meter, the sample laminates exhibited stable CNS bonds up to exposures of about of about 2000 hours.

Similar laminar structures of pigmented polyvinyl fluoride film exhibited stable CNS bonds up to exposures of about 2000 hours.

I claim:

1. A composition comprising a mixture of (a) a stable aqueous emulsion of an amino-ester modified vinyl polymer having attached to the carbon chain thereof monovalent radicals of the formula:

$$-\overset{O}{\underset{\|}{C}}-O-\overset{R}{\underset{R^1}{Z}}-N\overset{H}{\underset{R^2}{\diagup}}$$

wherein Z is an aliphatic hydrocarbon radical of 2 to 3 carbon atoms, R is selected from the group consisting of hydrogen and alkyl radicals of from 1 to 8 carbon atoms,

TABLE 4

| | | Visible light test | | Water test | |
|---|---|---|---|---|---|
| | Substrate | Time of exposure, hours | Bond strength, gm./in. | Time of exposure, hours | Bond strength, gm./in. |
| Sample: | | | | | |
| A | Pigmented PVC | 2,000 | CNS | 2,000 | CNS |
| B | Aluminum [2] | 2,000 | CNS | 2,000 | CNS |
| C | Pigmented PVC | 2,000 | CNS | 2,000 | CNS |
| D [1] | do | 72 | CNS | 72 | CNS |

[1] The mixed polymer emulsion of Example 9 was blended with titanium dioxide pigment to provide a blend of 75% by weight of mixed polymer emulsion and 25% by weight of TiO₂, based upon the dry weight of the solids in the polymer emulsion and the TiO₂.
[2] Coating of aluminum powder on PVC of coating weight corresponding to 7 ounces per square yard of film surface, product of Interchemical Corporation.

EXAMPLE 40

Samples of polyvinyl fluoride film were bonded to aluminum, which had been surface treated with Alodine 1200S, by means of an adhesive interlayer comprising the coalesced mixed polymer emulsion of Examples 3 and 9 blended with titanium dioxide pigment, by pressing the clear polyvinyl fluoride film which contained the ultraviolet light screening agent as in Example 38 and coated with the pigmented mixed polymer emulsion to the aluminum test panels under conditions of pressure, temperature and time of 200 p.s.i., 120° C. and 5 minutes, respectively. The mixed polymer emulsions were blended with 25% by weight of titanium dioxide pigment, based upon the dry weight of the solids in the polymer emulsion and the titanium dioxide. The results of evaluation tests are presented in Table 5 below.

$R^1$ is selected from the group consisting of hydrogen, hydroxyl radicals and alkyl radicals of from 1 to 8 carbon atoms, and $R^2$ is selected from the group consisting of hydrogen, hydroxyl and nontertiary alkyl radicals of from 1 to 8 carbon atoms, said vinyl polymer having an amino nitrogen content of at least 0.1% by weight, based upon the total weight of said vinyl polymer, and (b) a stable aqueous emulsion of vinyl-epoxy polymer having epoxide groups of the formula:

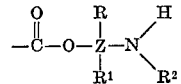

incorporated therein and characterized by an epoxide equivalent of greater than about $7.69 \times 10^{-5}$ mols of epoxide per gram of said vinyl-epoxy polymer, wherein said amino-ester modified vinyl polymer and said vinyl-

TABLE 5

| Adhesive | Adhesive bond strength, 1,000-hour boil | Post formability, 1,000-hour boil | Visible light test | |
|---|---|---|---|---|
| | | | Exposure, months | Bond strength, gm./in. |
| Sample: | | | | |
| A | Example 3 | CNS | 4 | 6 | 800 |
| B | Example 9 | CSN | 4 | 6 | 240 |
| C | 50% Example 3 50% Example 9 (by weight) | CNS | 4 | 6 | 560 | epoxy polymer are present in a weight ratio of between about 1/99 and about 99/1.

2. The composition of claim 1 wherein said amino-ester modified vinyl polymer is an acrylic-ester polymer having an amino nitrogen content of between about 0.1% and about 8% by weight, based upon the total weight of said amino-ester modified vinyl polymer and said vinyl-epoxy polymer is an acrylic-epoxy polymer having an epoxide equivalent of between about $7.69 \times 10^{-5}$ and about $7.69 \times 10^{-3}$ mols of epoxide per gram of said acrylic-epoxy polymer.

3. The composition of claim 2 wherein said amino-ester modified vinyl polymer is a copolymer of methacrylic acid, methyl methacrylate and ethyl or butyl acrylate.

4. The composition of claim 2 wherein said vinyl-epoxy polymer is a copolymer of glycidyl methacrylate and butyl or ethyl acrylate.

5. The composition of claim 2 wherein said acrylic-epoxy polymer is a copolymer of ethyl acrylate, methyl methacrylate and glycidyl methacrylate.

6. The composition of claim 1 wherein said monovalent radical attached to the carbon chain is of the formula:

$$-\overset{O}{\underset{\|}{C}}-O-CH_2-CH_2-NH_2$$

7. The composition of claim 6 wherein said amino-ester modified polymer is a copolymer of methacrylic acid, methyl methacrylate and ethyl or butyl acrylate.

8. The composition of claim 6 wherein the vinyl-epoxy polymer is a copolymer of glycidyl methacrylate and butyl or ethyl acrylate.

9. The composition of claim 6 wherein the vinyl-epoxy polymer is a copolymer of ethyl acrylate, methyl methacrylate and glycidyl methacrylate.

10. The composition of claim 1 wherein said monovalent radical attached to the carbon chain is of the formula:

$$-\overset{O}{\underset{\|}{C}}-O-CH_2-\overset{CH_3}{\underset{|}{CH}}-NH_2$$

11. The composition of claim 10 wherein said amino-ester modified polymer is a copolymer of methacrylic acid, methyl methacrylate and ethyl or butyl acrylate.

12. The composition of claim 10 wherein the vinyl-epoxy polymer is a copolymer of glycidyl methacrylate and butyl or ethyl acrylate.

13. The composition of claim 10 wherein the vinyl-epoxy polymer is a copolymer of ethyl acrylate, methyl methacrylate and glycidyl methacrylate.

14. The composition of claim 1 wherein said monovalent radical attached to the carbon chain is of the formula:

$$-\overset{O}{\underset{\|}{C}}-O-CH_2-\underset{\underset{OH}{|}}{CH}-NH_2$$

15. The composition of claim 14 wherein said amino-ester modified vinyl polymer is a copolymer of methacrylic acid, methyl methacrylate and ethyl or butyl acrylate.

16. The composition of claim 14 wherein the vinyl-epoxy polymer is a copolymer of glycidyl methacrylate and butyl or ethyl acrylate.

17. The composition of claim 14 wherein the vinyl-epoxy polymer is a copolymer of ethyl acrylate, methyl methacrylate and glycidyl methacrylate.

18. The composition of claim 1 wherein said monovalent radical attached to the carbon chain is of the formula:

$$-\overset{O}{\underset{\|}{C}}-O-\underset{\underset{NH_2}{|}}{CH}-CH_2-OH$$

19. The composition of claim 18 wherein said amino-ester modified vinyl polymer is a copolymer of methacrylic acid, methyl methacrylate and ethyl or butyl acrylate.

20. The composition of claim 18 wherein the vinyl-epoxy polymer is a copolymer of glycidyl methacrylate and butyl or ethyl acrylate.

21. The composition of claim 18 wherein the vinyl-epoxy polymer is a copolymer of ethyl acrylate, methyl methacrylate and glycidyl methacrylate.

22. A composition comprising a mixture of (a) a stable aqueous emulsion of a vinyl addition polymer of methacrylic acid, methyl methacrylate and ethyl or butyl acrylate having attached to the carbon chain thereof monovalent radicals of the formula:

$$-\overset{O}{\underset{\|}{C}}-O-\underset{\underset{R^1}{|}}{Z}-N\overset{H}{\underset{R^2}{\diagdown}}\overset{R}{\diagup}$$

wherein Z is an aliphatic hydrocarbon radical of 2 to 3 carbon atoms, R is selected from the group consisting of hydrogen and alkyl radicals of from 1 to 8 carbon atoms, $R^1$ is selected from the group consisting of hydrogen, hydroxyl radicals and alkyl radicals of from 1 to 8 carbon atoms, and $R^2$ is selected from the group consisting of hydrogen, hydroxyl and nontertiary alkyl radicals of from 1 to 8 carbon atoms, said vinyl addition polymer having an amino nitrogen content of between about 0.1% and about 8% by weight, based upon the total weight of said vinyl addition polymer, and (b) a stable aqueous emulsion of a copolymer of ethyl or butyl acrylate and glycidyl methacrylate having epoxide groups of the formula:

$$-\left[\begin{array}{c}O\\\diagup\diagdown\\\underset{H}{C}-\underset{H}{C}\end{array}\right]-$$

incorporated therein and characterized by an epoxide equivalent of between about $7.69 \times 10^{-5}$ and about $7.69 \times 10^{-3}$ mols of epoxide per gram of said epoxide containing copolymer wherein said vinyl addition polymer and said epoxide containing copolymer are present in a weight ratio of between 1/99 and 99/1.

23. A process for preparing a stable composition of a mixture of aqueous polymer emulsions which comprises mixing an emulsion polymerizate of an amino-ester modified vinyl polymer having attached to the carbon chain thereof monovalent radicals of the formula:

$$-\overset{O}{\underset{\|}{C}}-O-\underset{\underset{R^1}{|}}{Z}-N\overset{H}{\underset{R^2}{\diagdown}}\overset{R}{\diagup}$$

wherein Z is an aliphatic hydrocarbon radical of 2 to 3 carbon atoms, R is selected from the group consisting of hydrogen and alkyl radicals of from 1 to 8 carbon atoms, $R^1$ is selected from the group consisting of hydrogen, hydroxyl radicals and alkyl radicals of from 1 to 8 carbon atoms, and $R^2$ is selected from the group consisting of hydrogen and nontertiary alkyl radicals of from 1 to 8 carbon atoms, and an emulsion polymerizate of a vinyl-epoxy polymer having epoxide groups of the formula:

$$-\left[\begin{array}{c}O\\\diagup\diagdown\\\underset{H}{C}-\underset{H}{C}\end{array}\right]-$$

incorporated therein at a temperature below about 35° C. and with slight agitation to prevent coagulation of said polymer emulsions and in a ratio by weight of said amino-ester modified vinyl polymer to said vinyl-epoxy polymer of between about 1/99 and 99/1.

24. The process of claim 23 wherein the pH of said mixed polymer emulsion is adjusted to at least 9.

25. A process for preparing a stable composition of a mixture of aqueous polymer emulsions which comprises forming by emulsion polymerization an amino-ester modified vinyl polymer having attached to the carbon chain thereof monovalent radicals of the formula:

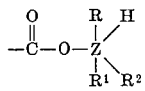

wherein Z is an aliphatic hydrocarbon radical of 2 to 3 carbon atoms, R is selected from the group consisting of hydrogen and alkyl radicals of from 1 to 8 carbon atoms, $R^1$ is selected from the group consisting of hydrogen, hydroxyl radicals and alkyl radicals of from 1 to 8 carbon atoms, and $R^2$ is selected from the group consisting of hydrogen and nontertiary alkyl radicals of from 1 to 8 carbon atoms; forming by emulsion polymerization a vinyl-epoxy polymer having epoxide groups of the formula:

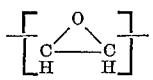

incorporated therein and characterized by an epoxide equivalent of between about $7.69 \times 10^{-5}$ and about $7.69 \times 10^{-3}$ mols of epoxide per gram of said vinyl-epoxy polymer; and mixing an emulsion of said amino-ester modified vinyl polymer and an emulsion of said vinyl-epoxy polymer at a temperature below about 35° C. and in a ratio by weight of said amino-ester modified vinyl polymer to said vinyl-epoxy polymer of between about 1/99 and 99/1.

26. The process of claim 25 wherein the pH of said mixed polymer emulsion is adjusted to at least 9.

27. A laminar structure comprising a layer of organic polymeric material firmly adhered to a substrate by means of an interlayer therebetween of an adhesive composition comprising a mixture of (a) a stable, aqueous emulsion of an amino-ester modified vinyl polymer having attached to the carbon chain thereof monovalent radicals of the formula:

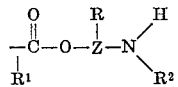

wherein Z is an aliphatic hydrocarbon radical of 2 to 3 carbon atoms, R is selected from the group consisting of hydrogen and alkyl radicals of from 1 to 8 carbon atoms, $R^1$ is selected from the group consisting of hydrogen, hydroxyl radicals and alkyl radicals of from 1 to 8 carbon atoms, and $R^2$ is selected from the group consisting of hydrogen, hydroxyl and nontertiary alkyl radicals of from 1 to 8 carbon atoms, said vinyl polymer having an amino nitrogen content of at least 0.1% by weight, based upon the total weight of said vinyl polymer, and (b) a stable, aqueous emulsion of a vinyl-epoxy polymer having epoxide groups of the formula:

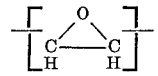

incorporated therein and characterized by an epoxide equivalent of greater than about $7.69 \times 10^{-5}$ mols of epoxide per gram of said vinyl-epoxy polymer, wherein said amino-ester modified vinyl polymer and said vinyl-epoxy polymer are present in a weight ratio of between 1/99 and 99/1, said mixture having been coalesced by the elimination of water therefrom.

28. The laminar structure of claim 27 wherein said amino-ester modified vinyl polymer is an acrylic-ester polymer having an amino nitrogen content of between about 0.1% and about 8% by weight, based upon the total weight of said amino-ester modified vinyl polymer.

29. The laminar structure of claim 27 wherein said vinyl-epoxy polymer is an acrylic-epoxy polymer having an epoxide equivalent of between about $7.69 \times 10^{-5}$ and about $7.69 \times 10^{-3}$ mols of epoxide per gram of said acrylic-epoxy polymer.

30. The laminar structure of claim 27 wherein the organic polymeric material is polyvinyl fluoride.

31. The laminar structure of claim 27 wherein the organic polymeric material is a polyimide.

References Cited

UNITED STATES PATENTS

| | | |
|---|---|---|
| 2,886,474 | 5/1959 | Kine et al. |
| 3,261,796 | 7/1966 | Simms. |
| 3,261,797 | 7/1966 | McDowell et al. |

FOREIGN PATENTS

| | | |
|---|---|---|
| 897,985 | 6/1962 | Great Britain. |

MURRAY TILLMAN, Primary Examiner

W. J. BRIGGS, SR., Assistant Examiner

U.S. Cl. X.R.

156—330, 331; 161—189, 219, 252; 260—29.7, 836